(12) United States Patent
Ricketts et al.

(10) Patent No.: US 8,801,513 B2
(45) Date of Patent: Aug. 12, 2014

(54) CORN COB CONVEYING AND CLEANING SYSTEM USING INDUCTION AND AIR FLOW FROM A HARVESTER FOR SEPARATING AND SPREADING LIGHT CROP RESIDUE

(75) Inventors: Jonathan E. Ricketts, Ephrata, PA (US); John J. Borsdorf, Leola, PA (US); James Minnihan, Moline, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/498,428

(22) PCT Filed: Sep. 28, 2010

(86) PCT No.: PCT/US2010/050464
§ 371 (c)(1),
(2), (4) Date: Apr. 25, 2012

(87) PCT Pub. No.: WO2011/041277
PCT Pub. Date: Apr. 7, 2011

(65) Prior Publication Data
US 2012/0208608 A1    Aug. 16, 2012

Related U.S. Application Data

(60) Provisional application No. 61/277,758, filed on Sep. 29, 2009.

(51) Int. Cl.
A01F 12/30 (2006.01)
(52) U.S. Cl.
USPC .......................................... 460/111; 460/112

(58) Field of Classification Search
USPC ............... 460/111, 112, 100, 96, 114, 42, 44; 239/650, 667, 672, 241
See application file for complete search history.

(56) References Cited

U.S. PATENT DOCUMENTS

| | | | | | |
|---|---|---|---|---|---|
| 2,935,193 | A | * | 5/1960 | Karlsson | 209/136 |
| 3,298,162 | A | * | 1/1967 | Medd | 56/13.9 |
| 3,630,009 | A | * | 12/1971 | Ashton | 56/11.9 |
| 3,721,075 | A | * | 3/1973 | Weiberg | 56/13.5 |
| 3,833,006 | A | * | 9/1974 | Temple | 460/99 |
| 3,952,889 | A | * | 4/1976 | Wanker et al. | 406/39 |
| 4,121,778 | A | * | 10/1978 | Quick | 241/79 |
| 4,178,743 | A | * | 12/1979 | Persoons et al. | 56/12.9 |
| 4,287,707 | A | * | 9/1981 | Persoons et al. | 56/12.8 |
| 4,642,977 | A | * | 2/1987 | Ramacher | 56/328.1 |
| 4,943,260 | A | * | 7/1990 | Fossum | 460/96 |
| 5,001,893 | A | * | 3/1991 | Stanley et al. | 56/328.1 |
| 5,042,240 | A | * | 8/1991 | Rocca et al. | 56/16.6 |
| 5,193,331 | A | * | 3/1993 | Quandt | 56/12.8 |
| 5,941,768 | A | * | 8/1999 | Flamme | 460/114 |

(Continued)

Primary Examiner — Arpád Fábián-Kovács
(74) Attorney, Agent, or Firm — Patrick M. Sheldrake; Seyed V. Sharifi T.

(57) ABSTRACT

A cob conveying and cleaning system for use with a corn harvester, incorporating air induction in cooperation with an air flow from the harvester, for cleaning and separating lighter crop residue to be returned to the field from a mixed flow of the residue and cobs, such that the cleaned cobs can be collected, and the lighter residue optionally spread on the field. The air flow and induction are combined to cooperatively lift or draw the lighter residue from the mixed flow, and to optionally spread the removed lighter residue over a field. The induction apparatus can be located on the harvester, and used as a residue spreader when cobs are not collected.

20 Claims, 11 Drawing Sheets

(56) References Cited

U.S. PATENT DOCUMENTS

| | | | |
|---|---|---|---|
| 6,238,286 B1 * | 5/2001 | Aubry et al. | 460/111 |
| 6,272,819 B1 * | 8/2001 | Wendte et al. | 56/11.9 |
| 6,572,035 B1 * | 6/2003 | Pfeiffer | 239/650 |
| 6,719,627 B2 * | 4/2004 | Wolters et al. | 460/111 |
| 6,893,340 B1 * | 5/2005 | Schmidt et al. | 460/111 |
| 7,390,253 B2 * | 6/2008 | Farley et al. | 460/111 |
| 7,467,997 B2 * | 12/2008 | Niermann et al. | 460/111 |
| 7,566,266 B1 * | 7/2009 | Ricketts et al. | 460/101 |
| 7,651,391 B2 * | 1/2010 | Weichholdt et al. | 460/111 |
| 7,731,578 B2 * | 6/2010 | Birrell et al. | 460/100 |
| 7,811,161 B1 * | 10/2010 | Ricketts et al. | 460/26 |
| 7,837,542 B1 * | 11/2010 | Ricketts et al. | 460/99 |
| 7,862,411 B1 * | 1/2011 | Ricketts et al. | 460/23 |
| 7,867,071 B1 * | 1/2011 | Ricketts et al. | 460/23 |
| 7,896,732 B2 * | 3/2011 | Benes et al. | 460/112 |
| 7,927,198 B2 * | 4/2011 | Redekop et al. | 460/99 |
| 7,927,200 B2 * | 4/2011 | Van Overschelde et al. | 460/112 |
| 7,993,188 B2 * | 8/2011 | Ritter | 460/111 |
| 8,010,262 B2 * | 8/2011 | Schroeder et al. | 701/50 |
| 8,113,353 B2 * | 2/2012 | Redekop et al. | 209/137 |
| 8,118,650 B2 * | 2/2012 | Isaac et al. | 460/111 |
| 8,147,303 B2 * | 4/2012 | Lauer et al. | 460/112 |
| 8,286,798 B2 * | 10/2012 | Ricketts et al. | 209/138 |
| 2005/0124399 A1 * | 6/2005 | Holmen | 460/111 |
| 2005/0124400 A1 * | 6/2005 | Schmidt et al. | 460/111 |
| 2009/0104952 A1 * | 4/2009 | Redekop et al. | 460/80 |
| 2009/0113867 A1 * | 5/2009 | Birrell et al. | 56/13.3 |
| 2009/0124309 A1 * | 5/2009 | Redekop et al. | 460/100 |
| 2011/0034222 A1 * | 2/2011 | Ricketts et al. | 460/42 |

* cited by examiner

CORN COB CONVEYING AND CLEANING SYSTEM USING INDUCTION AND AIR FLOW FROM A HARVESTER FOR SEPARATING AND SPREADING LIGHT CROP RESIDUE

This application claims the benefit of U.S. Provisional Application No. 61/277,758, filed Sep. 29, 2009.

TECHNICAL FIELD

This invention relates generally to a cob conveying system for use with a corn harvester, which more particularly incorporates air induction in cooperation with air flow from the harvester for cleaning and separating lighter crop residue from the cobs, such that the clean cobs can be collected or otherwise utilized, and the inducted lighter residue spread on the field or otherwise disposed of. The invention also relates to residue separation apparatus configurable in multiple modes, including several modes for inductively separating and cleaning lighter crop residue from cobs, and a more traditional crop residue spreading mode.

BACKGROUND ART

U.S. Provisional Application No. 61/277,758, filed Sep. 29, 2009, is incorporated herein by reference in its entirety.

Presently, there is an increased demand for corn cobs as a feedstock for cellulosic ethanol, as well as other uses. As a result, there is heightened interest in collecting corn cobs during corn harvest. There is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the stover, e.g., cobs is instead collected, nutrient levels could be lowered as a result. To mitigate this concern, some consider it desirable when collecting cobs, to collect mostly just the cobs, that is, with substantially all loose or detached residual elements of the residue, which are lighter than the cobs, mainly, husks and leaves and fragments thereof, returned to the field. Thus, it is sought to have a cob conveying system adapted for operation in connection with a corn harvester, and optionally a cob collection device, which incorporates an ability to separate or remove other lighter crop residue or stover from the cobs, and return the other lighter residue to the field or direct it to another location.

Numerous apparatus have been proposed for use in connection with cob conveying devices, for cleaning or separating other stover and crop residue from the cobs. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. This harvesting procedure has been almost entirely replaced by modern self-propelled combine type harvesters, which separate and collect the corn kernels, and discharge the cobs and other stover onto the field.

Combines which harvest the corn and separate the kernels from the cobs and other stover or residue, then discharge the cobs and other stover onto the field, are now the industry standard. More recently, devices for collecting cobs discharged from combines have been developed. Several of such known devices have variously utilized a towed cart or wagon for receiving and holding the cobs, and a conveying system for conveying the cobs from the combine to the cart or wagon. Some of the cob collection devices also include apparatus for separating the cobs from the lighter other stover or residue downstream or remotely from the combine, mainly using air flow. Reference in this regard, Flamme U.S. Pat. No. 5,941,768, issued Aug. 24, 1999, which discloses a cob collection unit pulled behind a combine to collect on a first conveyor all the residue discharged from the combine, with a separation unit behind the conveyor including a second conveyor, and utilizing a fan to suck the lighter stover from the cobs as they are released from the top of the second conveyor and to blow the stover back onto the field. Redekop et al. U.S. Patent Publication Nos. 20090095662 published Apr. 16, 2009; 20090104952 published Apr. 23, 2009; and 20090124309 published May 14, 2009, disclose a pulled cob collection unit, which utilizes a sequential series of inclined belt conveyors, and blower or suction fans disposed remotely from the combine for directing air through the discharged material as it falls from the upper end of one conveyor onto a lower end of the next conveyor, such that the heavier cobs are to continue to the next conveyor and the lighter stover or residue will be carried away by the air flow, with the cobs being conveyed into a collection tank by a further conveyor or conveyors.

An observed shortcoming of the above referenced known cob conveying and cleaning systems, is a lack of utilization of available air flow discharged from the cleaning system of a harvester, which air flow can be quite voluminous. The known systems also do not use existing residue spreaders in a residue cleaning or separating capacity. At most, when the known cob cleaning systems are utilized, the existing spreader is either not used, or used only for minor chaff distribution and spreading roles. As another shortcoming, the fans of the known residue separating systems are also carried on the trailer, adding additional apparatus, weight, complexity, and power requirements to the trailer.

Thus, what is sought is a cob conveying and cleaning system for use in association with a corn harvester such as a combine, which provides one or more of the capabilities set forth above, namely, effective separating or cleaning of lighter other crop residue from the cobs, utilizing available apparatus and capabilities found on a harvester, namely, air flow from the cleaning system of the harvester, and existing residue spreader devices, while minimizing shortcomings of known devices and systems, namely, increased apparatus, weight, complexity and power demand of a trailer towed by the harvester.

SUMMARY OF THE INVENTION

What is disclosed is a cob conveying and cleaning system for use in association with a corn harvester such as a combine, which provides one or more of the capabilities set forth above, namely, effective separating or cleaning of lighter other crop residue from the cobs, while minimizing shortcomings of known devices and systems, namely, lack of utilization of existing harvester spreading apparatus and available air flow from the harvester, and increased apparatus, weight, complexity and power demand of a trailer towed by the harvester.

According to a preferred aspect of the invention, the system includes a conveyor disposed beneath a discharge outlet of the harvester, configured and operable for receiving and conveying a flow of the cobs and other residue lighter than the cobs from the harvester, and inductive residue separating apparatus contained in a housing disposed above the conveyor. The housing includes at least one inlet opening disposed in a path of, or in proximity to, the air flow and facing the flow of cobs and other residue lighter than the cobs. The housing including an internal cavity containing at least one impeller configured so as to be rotatable in cooperation with, or aided by, the air flow from the harvester, which is voluminous and can be on the order of several hundred cubic feet per minute, for inducting at least some of the air flow into the housing so as to carry with it a substantial amount of the other residue lighter than the cobs, and discharging the inducted air and residue from the housing through the at least one discharge opening, leaving the cobs to be conveyed from the harvester.

Typically, the discharge outlet of the harvester faces downwardly and rearwardly. Accordingly, the conveyor of the invention is disposed below and rearwardly of the discharge outlet, in position for receiving the flow of lighter crop residue and cobs. The residue separating apparatus of the invention is preferably disposed just rearwardly of the discharge outlet and above the conveyor, such that the inlet opening or openings is/are positioned directly adjacent to or partially in the path of the air flow. The induction generated by the rotation of the impeller or impellers will be sufficient to create a low or negative pressure condition in an induction zone outwardly of the inlet opening or openings that will draw the air flow from the cleaning system toward and through the inlet opening or openings, with sufficient power to separate the lighter elements of the residue from the heavier cobs, and redirect or carry the lighter residue into the inlet opening or openings, but not the cobs, such that the cobs will continue along their original path from the harvester. This is advantageous as it uses the existing energy and motion of the air flow originating from the cleaning system of the harvester, such that this energy is not wasted. As another advantage, the impeller or impellers, does/do not need to have sufficient inductive power for performing the separating function alone. This enables the residue separating apparatus to be lighter and more compact.

As another advantage of the invention, a conventional crop residue spreader can be utilized as the residue separating apparatus, and in this role, can also be utilized for spreading the separated residue over a field. As another advantage, when not used for residue separation, the separating apparatus can be configured for use in the traditional crop spreading role.

As a further advantage, the separating apparatus can be utilized in a variety of positions and orientations, as best suited for a particular application. As an example, the separating apparatus can be positioned such that the inlet opening faces generally forwardly toward the discharge outlet, at least partially in the path of the cleaning system air flow, but not directly in the path of the residue flow. In particular, in this configuration, a deflector plate within the rear enclosure of the harvester will be positioned and oriented to direct the residue flow, which here is airborne, downwardly and forwardly of the inlet opening, with the air flow directed more horizontally and rearwardly through the residue flow. This is advantageous, as the air flow tends to break up the residue flow at least somewhat as it is airborne, which facilitates separation of the lighter elements from the cobs. The induction generated by the impellers of the separating apparatus will create a low or negative pressure condition forwardly of the inlet opening or openings, toward which the air flow will go so as to flow into the inlet opening or openings, with sufficient power to separate the lighter elements of the residue from the cobs. The cobs, which have more downward momentum due to their greater mass, will then continue along the original downward flow path.

As another example, residue separating apparatus can be positioned such that the inlet opening or openings will face generally downwardly toward the conveyor, and a portion may face the air flow, but will be above the bulk of the residue flow. In this configuration, the housing of the residue separating apparatus and the conveyor extend generally convergingly toward the rear, such that the space therebetween through which the crop residue is conveyed and the air flows, will gradually decrease in extent, with the result that at least a portion of the air flow will redirect toward the inlet or inlets. Appropriate sheeting or curtains can be provided around all or a portion of this area to reduce air which can escape in other directions to facilitate this. This flow, combined with the induction of the impeller or impellers, will act to lift and separate the lighter elements of residue from the heavier cobs, and carry them into the housing, while the cobs continue along the conveyor.

As another example, the residue separating apparatus can be positioned such that the inlet opening or openings are oriented at one or more intermediate positions between the position facing the discharge outlet and the downward orientation, partially or fully in a path of the air flow exiting the harvester. In this configuration, the lighter elements cab be drawn and separated from the heavier cobs just before or as they land and settle on the conveyor, and while they are still airborne at least somewhat, but in a manner such that the cobs are not inducted into the separating apparatus.

As another preferred aspect of the invention, the residue separating apparatus can comprise two of the impellers configured for counter rotation in a side by side relationship, e.g., so as to extend across the width of the conveyor or discharge outlet, and can direct the residue outwardly toward the sides.

As an optional feature of the invention, the residue separating apparatus is adjustably movable relative to the harvester and the conveyor, for adjusting a position of the at least one inlet opening, and so as to be configurable when the conveyor is absent, for use in a conventional manner as a spreader for receiving a flow of crop residue directly from the harvester and spreading the crop residue over a field. This enables adjusting the system for different conditions, e.g., air flow levels, velocity, etc., and residue amounts, consistency, and the like.

As another preferred aspect of the invention, the conveyor is carried on a trailer towed by the harvester and powered by a system in connection with a power system of the harvester, and the residue separating apparatus is carried on the harvester and powered directly by the power system thereof. As a result, the trailer can be lighter than if it also carried the residue separating apparatus, or it will have more capacity for other apparatus, such a cob container or bin.

DETAILED DESCRIPTION OF THE INVENTION

Figure 1:
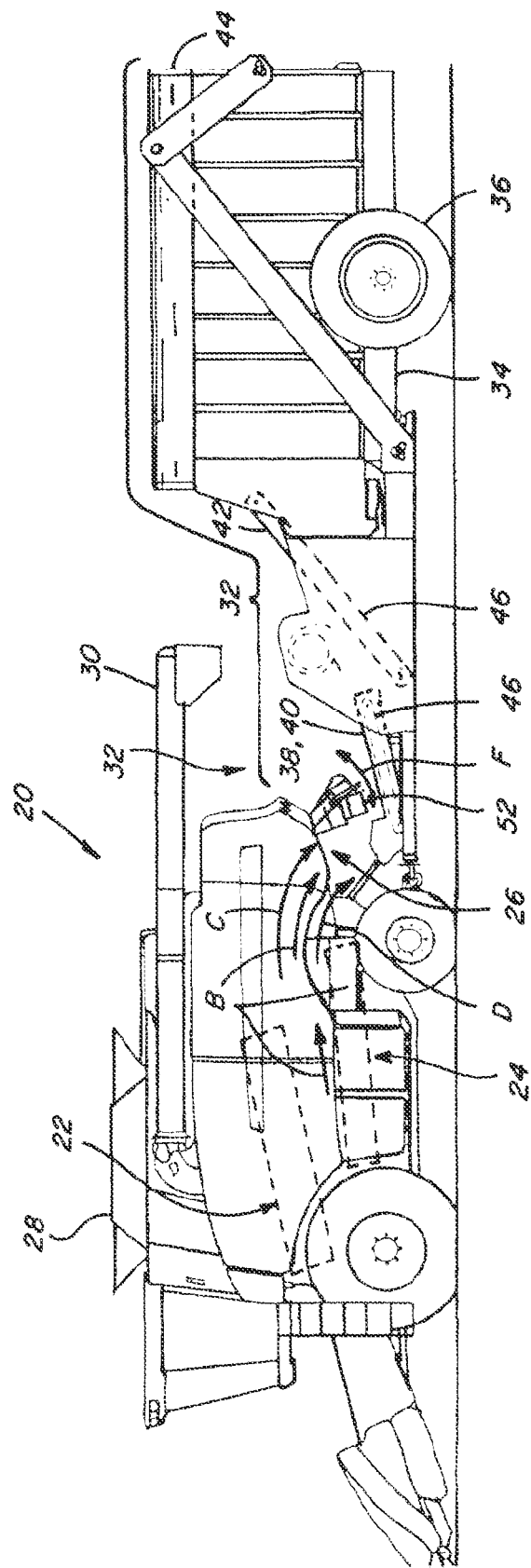
FIG. 1 is a fragmentary side view of a representative agricultural harvester, including a cob conveying and cleaning system according to the invention.
Figure 2:
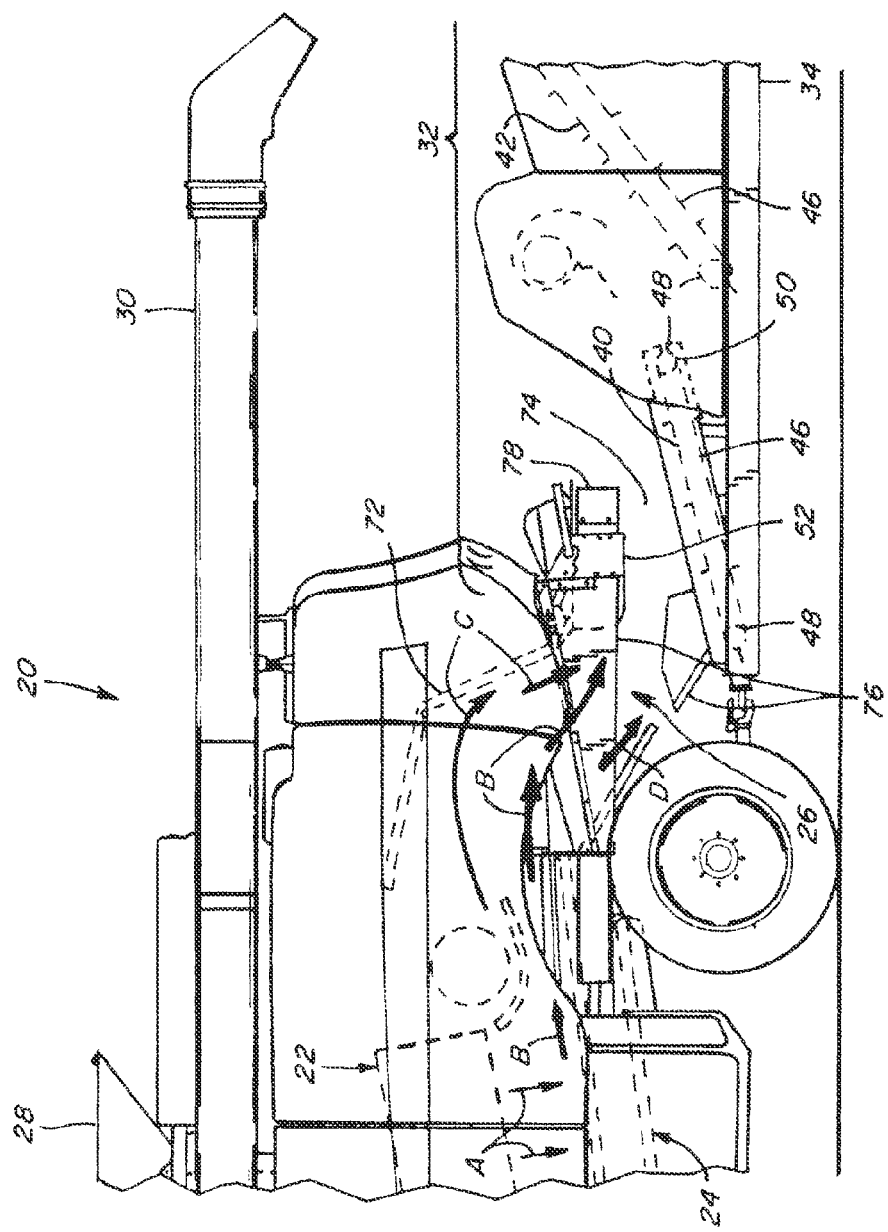
FIG. 2 is an enlarged fragmentary side view of the harvester and cob conveying and cleaning system of the invention, with a residue separating apparatus of the system shown in one operative position.

Referring now the drawings, in FIGS. 1 and 2, a representative agricultural harvesting machine 20 is shown, which is a combine constructed and operable in the well known manner for harvesting whole ears of corn from corn plants as the combine travels over a field. Combine 20 includes well known apparatus that gathers and conveys the ears of corn into a threshing system 22 within the combine which removes most of the husk surrounding the ears, and the corn kernels from cobs of the ears, and directs a flow of the corn, some of the cobs and fragments thereof, and other residue or stover lighter than the corn and cobs, such as fragments of husks, leaves, dust, and the like, all as generally denoted by arrows A, within a rear chamber of combine 20 to a cleaning system 24 of the combine. At the same time, cleaning system 24 has a fan that generates an upward and rearward flow of air, denoted by arrows B, utilized to separate and carry away in an airborne manner the lighter elements of other residue from the kernels, and continue to carry these lighter elements rearwardly through the internal space above system 24 to a rear discharge outlet 26. Also at the same time, larger residue other than corn kernels, such as loose husks, leaves and the like, which are typically of a paper like consistency and are relatively light, dust, and a large amount of cobs and cob fragments, are propelled from threshing system 22 rearwardly within the end of machine 20, as a flow denoted by arrows C, and is deflected downwardly toward discharge outlet 26 on the rear end of machine 20, so as to mix with flow B in the rear confines of machine 20.

Cleaning system 24 of combine 20 is operable in the conventional manner to separate the cobs and other larger elements of the corn residue or stover from the smaller kernels of corn and smaller elements of residue, and the corn is collected and conveyed into a clean grain tank 28 on combine 20, or other receiver. At the same time, lighter elements of the residue mixed with the kernels, cobs and cob fragments will be released, so as to be carried rearwardly by air flow B, and such that the heavier cobs and cob fragments will travel rearwardly along the upper surfaces of the cleanings system toward outlet 26, as denoted by arrows D. The clean corn is then periodically unloaded from tank 28 using an unloader conveyor 30 in the conventional manner, by swinging conveyor 30 to a sidewardly extending position (not shown—conveyor 30 being illustrated in a stowed or travel position here).

Figure 3:
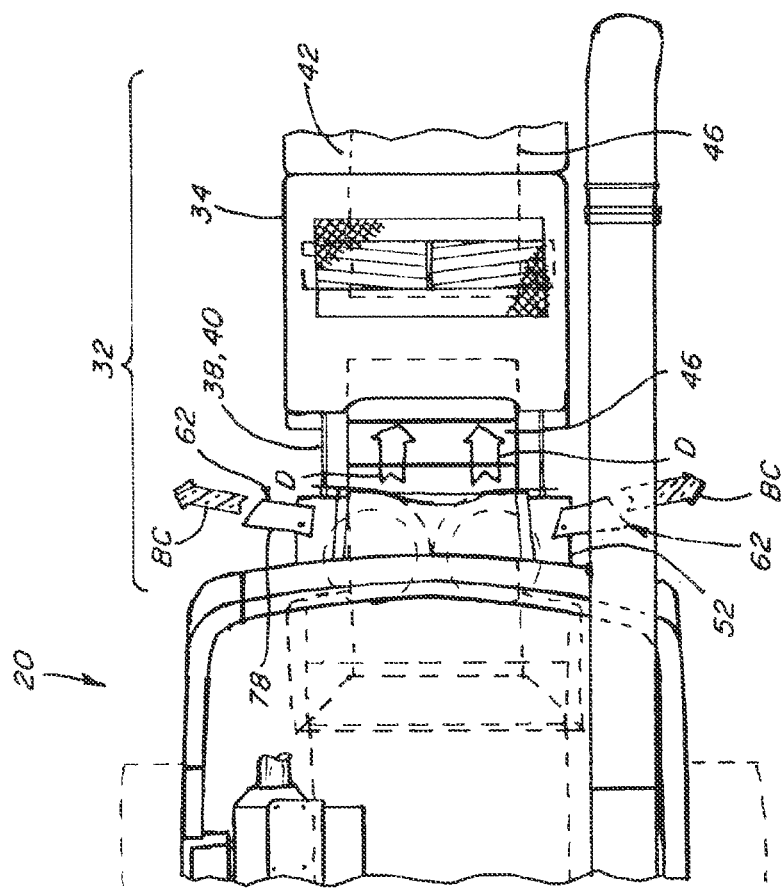
FIG. 3 is a fragmentary top view of the harvester and cob conveying and cleaning system.

Referring also to FIG. 3, machine 20 is shown including a cob conveying and cleaning system 32, constructed and operable according to the teachings of the present invention, for receiving the flows of husks, leaves, cobs and other elements of corn residue or stover denoted variously by arrows B, C and D, separating the lighter other elements of residue from the cobs, discharging the lighter residue, and conveying the clean cobs away. Here, system 32 utilizes a trailer 34 suitably supported on wheels 36, or tracks (not shown) and configured for towing by machine 20, for carrying aspects of system 32, including a conveyor system 38.

Conveyor system 38 of system 32 here includes a first inclined conveyor 40 and a second inclined conveyor 42, extending to a cob collection device 44 also carried on the trailer, although it should be understood that the present invention can comprise any number of conveyors, and may or may not include a collection device. Conveyors 40 and 42 are depicted here as belt type conveyors, each of which includes an endless belt 46 which extends about a roller 48 at the lower end, and which is driven by a drive roller 50 at the upper end, which can be powered by a suitable drive, such as, but not limited to, a fluid or electric motor, belt, chain or the like, for moving the upper surface of the belt rearwardly carrying cobs and any other residue thereon toward collection device 44. To facilitate this, a front end of first conveyor 40 is disposed directly beneath discharge outlet 26 in the path of flows B, C and D.

Figure 4:
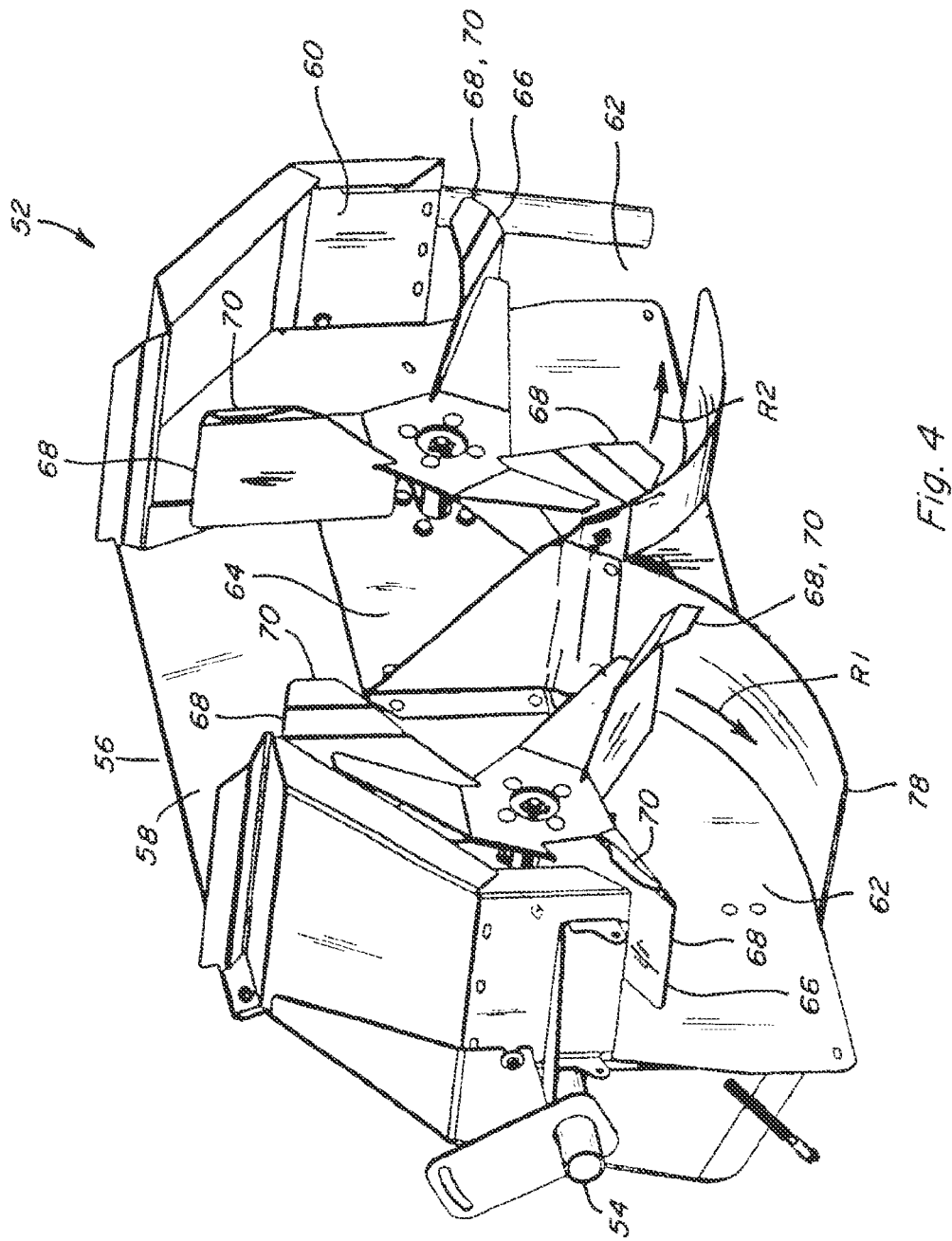
FIG. 4 is a perspective view of a residue separating apparatus of the cob conveying and cleaning system, rotated so as to look into the apparatus through an inlet opening thereof.
Figure 5:
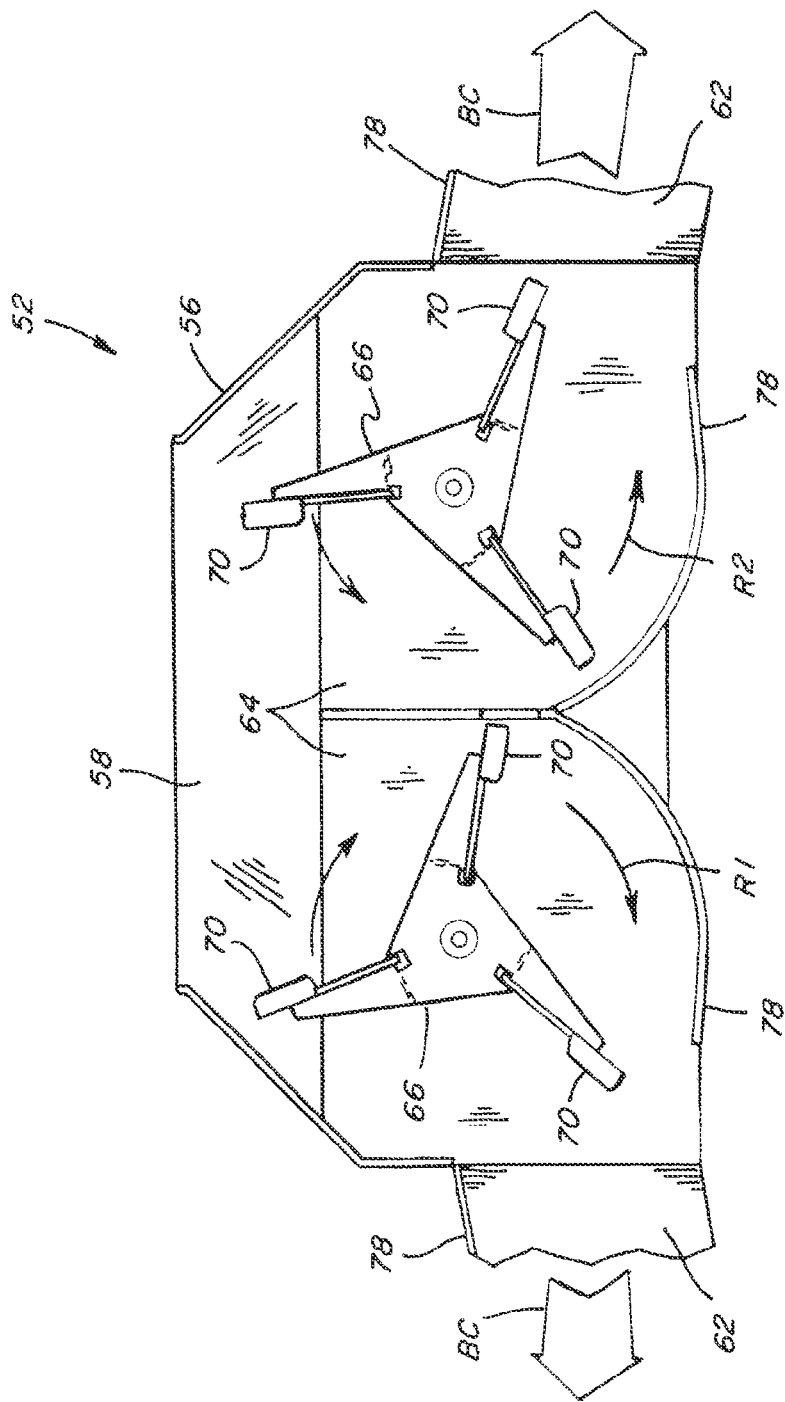
FIG. 5 is an end view of the residue separating apparatus.

Referring also to FIGS. 4 and 5, system 32 also includes a residue separating apparatus 52 carried on machine 20 adjacent to the rear end of discharge outlet 26. Here, residue separating apparatus is supported by machine 20 so as to be movable through a range of operating positions, including a generally horizontal position (FIGS. 2, 3, 8 and 9), a generally vertical position (FIG. 10), and a range of intermediate or tilted positions between horizontal and vertical (FIGS. 1 and 11), as denoted by arrow F in FIG. 1. This can be accomplished using any suitable support apparatus for connecting apparatus 52 to machine 20, such as, but not limited to, pivoting support brackets 54 on opposite sides of apparatus 52, as best shown in FIG. 4, with locking or detent elements, clamps, etc., for holding the apparatus at a desired position.

Residue separating apparatus 52 includes a housing 56 of sheet metal or other suitable construction, defining a first inlet opening 58, a second inlet opening 60 about perpendicular to first opening 58, and a pair of sidewardly facing discharge openings 62, all connecting with an interior cavity 64. Housing 56 contains a side by side pair of impellers 66, mounted on drive shafts for counter rotation toward the respective discharge openings 62, as denoted by arrows R1 and R2, by suitable drives such as conventional fluid or electric motors, belts, or the like. Impellers 66 each include blades 68 preferably configured and operable during the rotation of the impellers for generating a low or negative pressure condition in and about openings 58 and 60, sufficient for inducting air and airborne material through those openings, then carrying the material through cavity 64 and discharging it through discharge openings 62.

Figure 6:
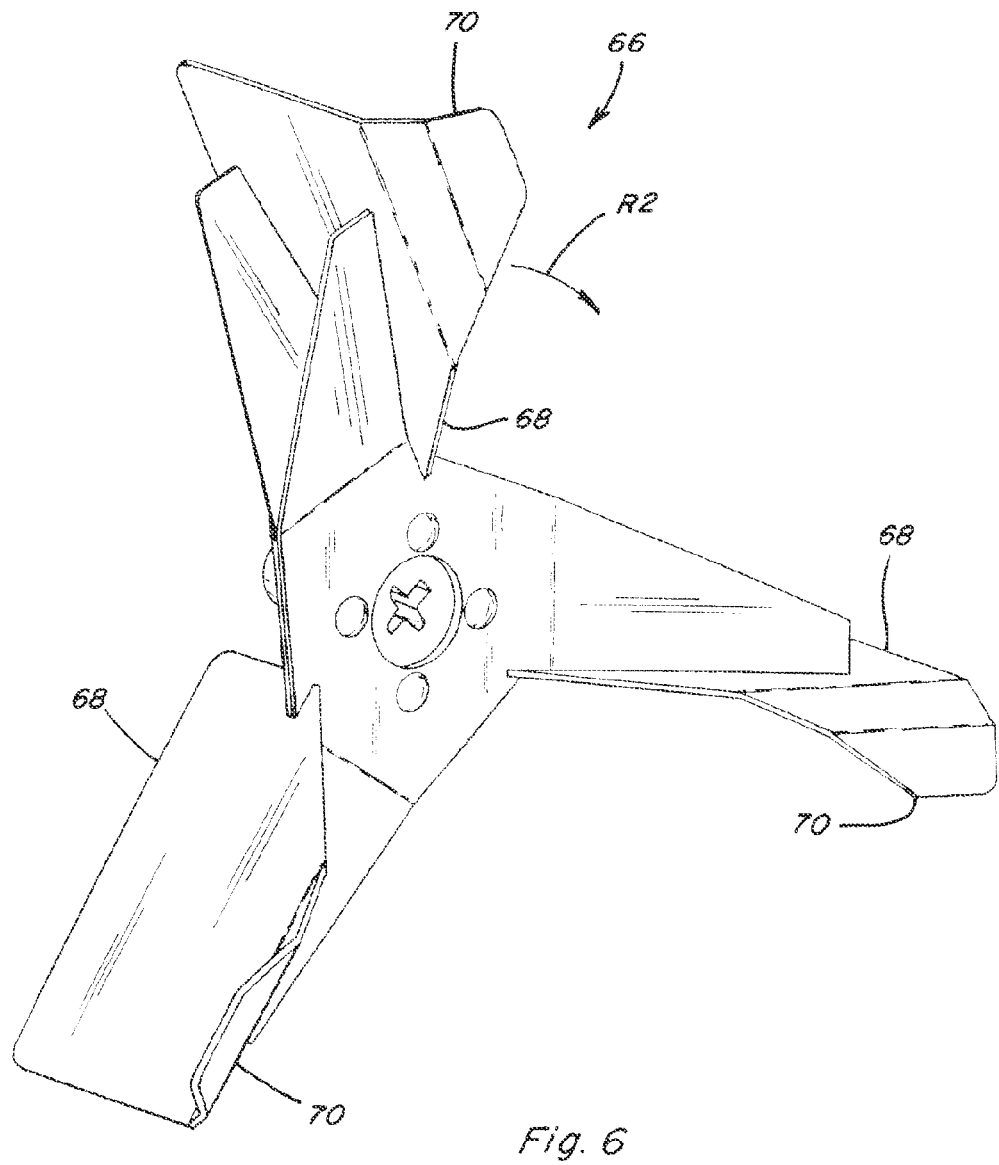
FIG. 6 is a perspective view of an impeller of the residue separating apparatus.
Figure 7:
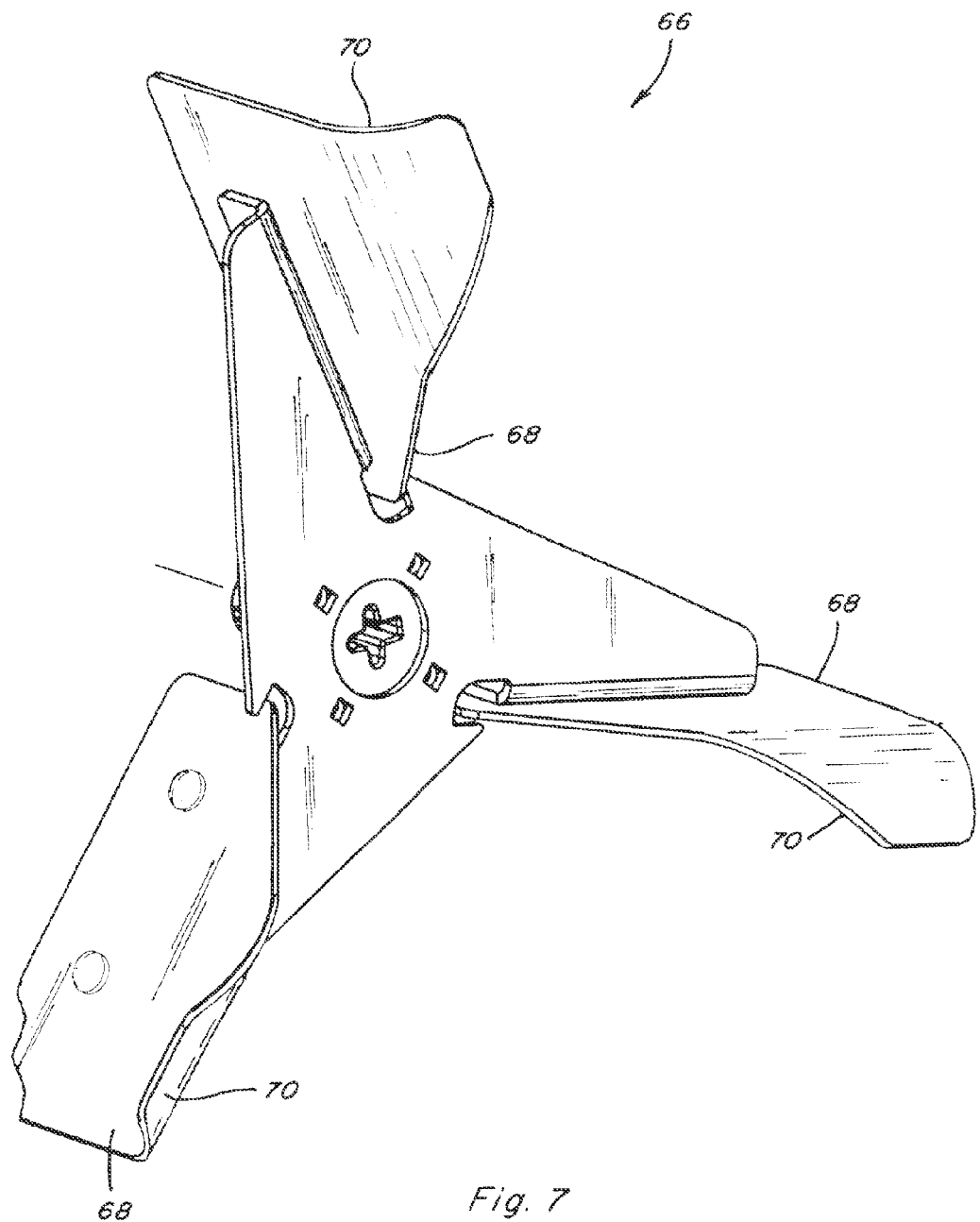
FIG. 7 is a perspective view of alternative impeller for the residue separating apparatus.

Referring also to FIGS. 5 and 6, the inductive capability of impellers 66 is achieved via the shapes of blades 68, which have outer edge portions 70 adjacent to openings 58 and 60, configured so as to have a positive angle of attack (extending in the direction of rotation R1 or R2) for creating the low or negative pressure condition in and about the inlet openings, operable for drawing or inducting air and airborne material through the openings for the purposes of the invention. A more complete description of suitable impellers 66 is disclosed in Schmidt, et al. U.S. Pat. No. 6,893,340 issued May 17, 2005, entitled ROTARY ACCELERATING APPARTUS FOR A VERTICAL STRAW AND CHAFF SPREADER OF AN AGRICULTURAL COMBINE, which patent is hereby incorporated herein by reference in its entirety.

Figure 8:
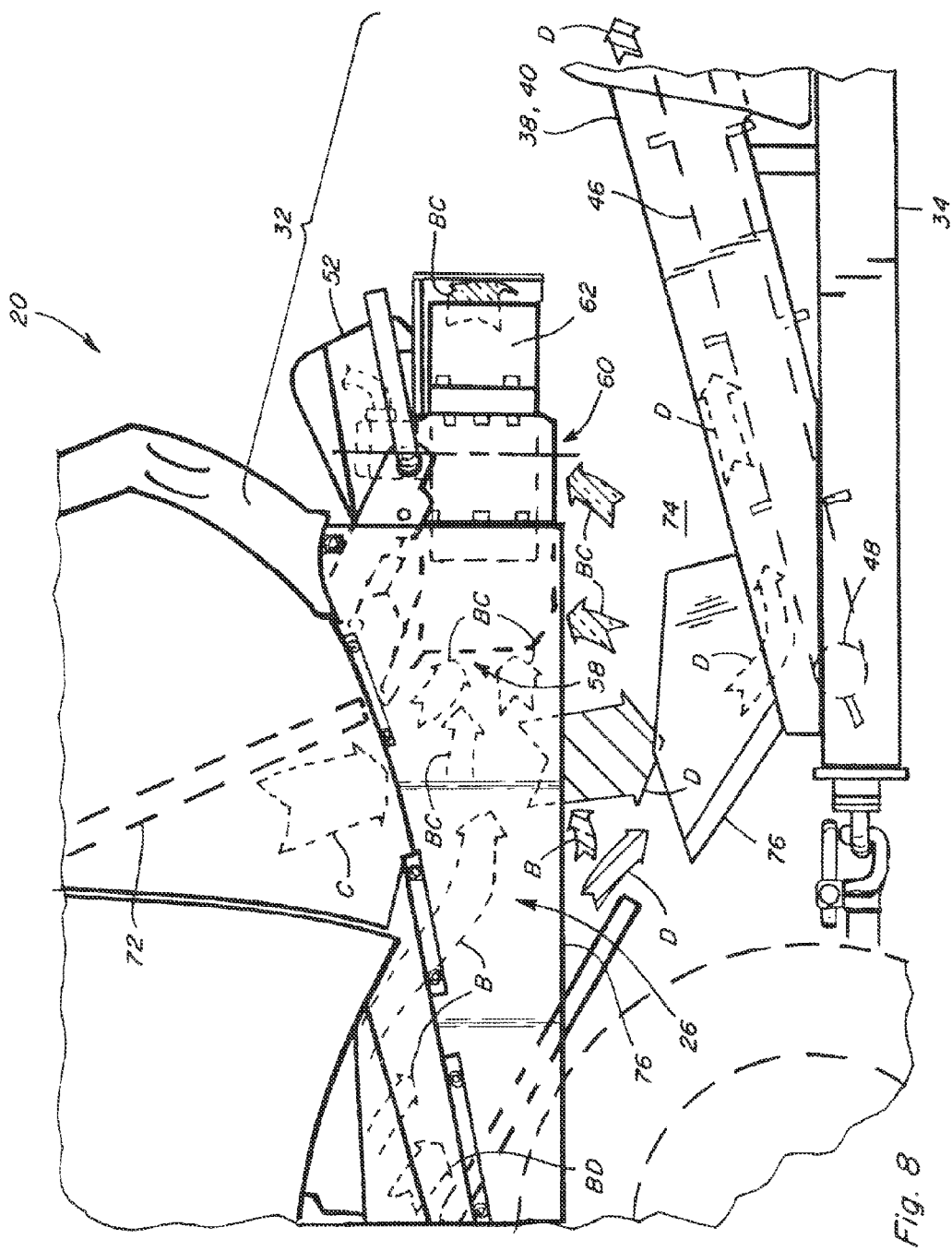
FIG. 8 is another fragmentary side view of the harvester and system of the invention, illustrating aspects of operation thereof.
Figure 9:
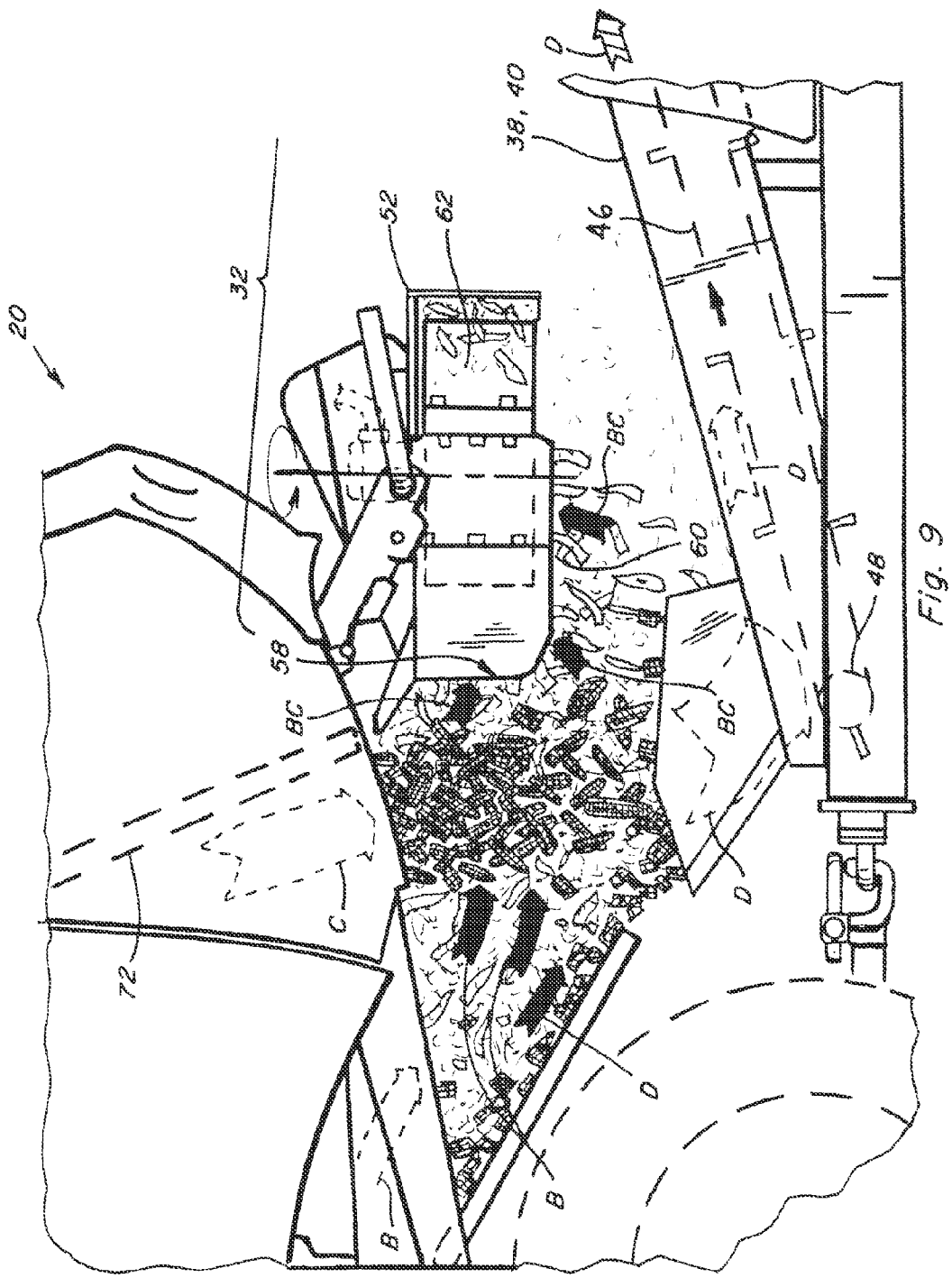
FIG. 9 is another fragmentary side view of the harvester and system of the invention, illustrating aspects of operation thereof.

Referring also to FIGS. 8 and 9 which illustrate operational aspects of system 32, residue spreading apparatus is shown in a generally horizontal position, generally above the forward end of first conveyor 40, such that first inlet opening 58 faces generally forwardly and bounds and defines a rear periphery of discharge outlet 26, while second inlet opening 60 faces downwardly, and is spaced above the upper surface of first conveyor 40. During operation of machine 20, as explained above, cleaning system 24 will direct the flow of air and residue B rearwardly through the rear of machine 20 toward discharge outlet 26. At the same time flow D, mainly of heavier cobs and cob fragments, will be conveyed rearwardly over the upper surfaces of the cleaning system, also toward outlet 26. Also at the same time, flow C is propelled through the rear of machine 20 by threshing system 22. Flow C will typically be more voluminous than flows B and D, and will include a large number of cobs and cob fragments, mixed with lighter elements of residue, and will be deflected downwardly by an internal deflector plate 72 disposed above first inlet opening 58 of residue separating apparatus 52.

Here, it should be noted that inlet opening 58 is positioned and oriented so as to be out of the direct path of flow C, but adjacent to that flow. First inlet opening 58 will be directly in the path of air and residue flow B, but on the opposite side of downward flow C. That is, flow B must cross through the more voluminous flow C to enter inlet opening 58. Second inlet opening 60 will not be directly in any of the residue flows, but instead faces downwardly toward the first conveyor so as to be above the flow onto and conveyed by that conveyor. However, the low or negative pressure condition generated by the rotation of impellers 66, in combination with the air of flow B, which is voluminous (several hundred cubic feet per minute or more) and typically powerful, will create a rearward cross flow through flow C, sufficient to induct at least some of the lighter elements of residue of flows B and C into first inlet opening 58, as denoted variously by arrows BC, but not the heavier cobs as a result of their greater momentum due to their mass which keeps them on a downward path, as denoted by arrows D.

At the same time, the heavier downward flow C and gravity will redirect the remaining elements of lighter flow B downwardly through discharge outlet 26 and into an induction zone just below larger second inlet opening 60 of apparatus 52. The low or negative pressure condition present in this area, in combination with the air of flow B, which again will be voluminous and still powerful, will operate to lift and induct the lighter elements of residue upwardly into apparatus 52, as again denoted by arrows BC, but not the cobs, again because of their greater mass. In both instances, the air flow B will facilitate this by acting to break up and reduce the density of flow C as it passes therethrough, to facilitate separation of the lighter elements and induction thereof into the residue separating apparatus. The flow B will also tend to be agitated somewhat, including being deflected upwardly, by the movement of belt 46 of conveyor 40, which is preferably slatted, which will facilitate the induction of the lighter elements of residue. Further, it can be observed that conveyor 40 is tilted upwardly toward the rear, so as to extend generally convergingly in that direction with residue separating apparatus 52, such that an area 74 between conveyor 40 and apparatus 52 will be progressively smaller toward the rear. This also facilitates the entry and directing of the air flow B and lighter residue elements toward inlet opening 60 of the separating apparatus.

Still further in this regard, a partial enclosure, for instance, of sheet metal or a flexible curtain, can optionally extend about a portion of discharge outlet 26 and the region between apparatus 52 and conveyor 40, to reduce the amount of air that can escape to the side, as illustrated by side enclosures 76 extending forwardly of apparatus 52, and on the forward end of conveyor 40, in FIGS. 2 and 8 (upper enclosure removed in FIG. 9 for clarity). As an advantage, as flow D mostly of cobs, from the cleaning system will pass below inlet opening 60 in a manner such that any loose, lighter elements of residue contained in that flow can be inducted into the residue separating apparatus, with those of the other flows B and C, which will be facilitated by the presence of the lower side enclosures 76.

Once inducted into apparatus 52, the lighter residue and air will be propelled sidewardly therefrom through discharge openings 62 by impellers 66, as denoted by arrows BC in FIG. 3. Appropriate deflectors 76 about openings 62 can be utilized for controlling this flow, in the well known manner. The clean cobs, denoted by arrows D, will fall onto belt 46 of conveyor 40, be conveyed thereby onto conveyor 42, and carried by that conveyor to cob collection device 44.

Figure 10:
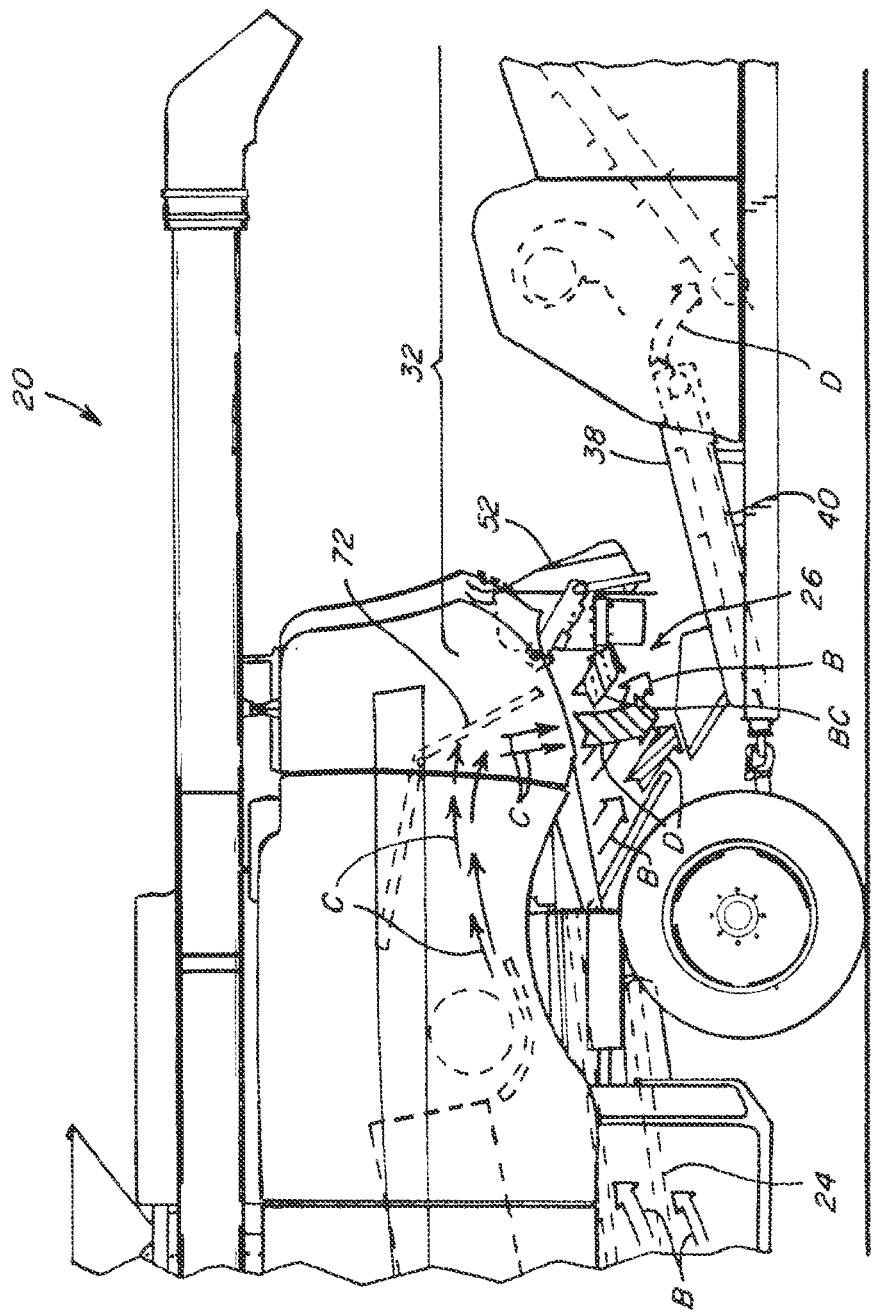
FIG. 10 is a fragmentary side view of the harvester and system of the invention, with the residue separating apparatus in a vertical operating position and illustrating aspects of operation thereof.
Figure 11:
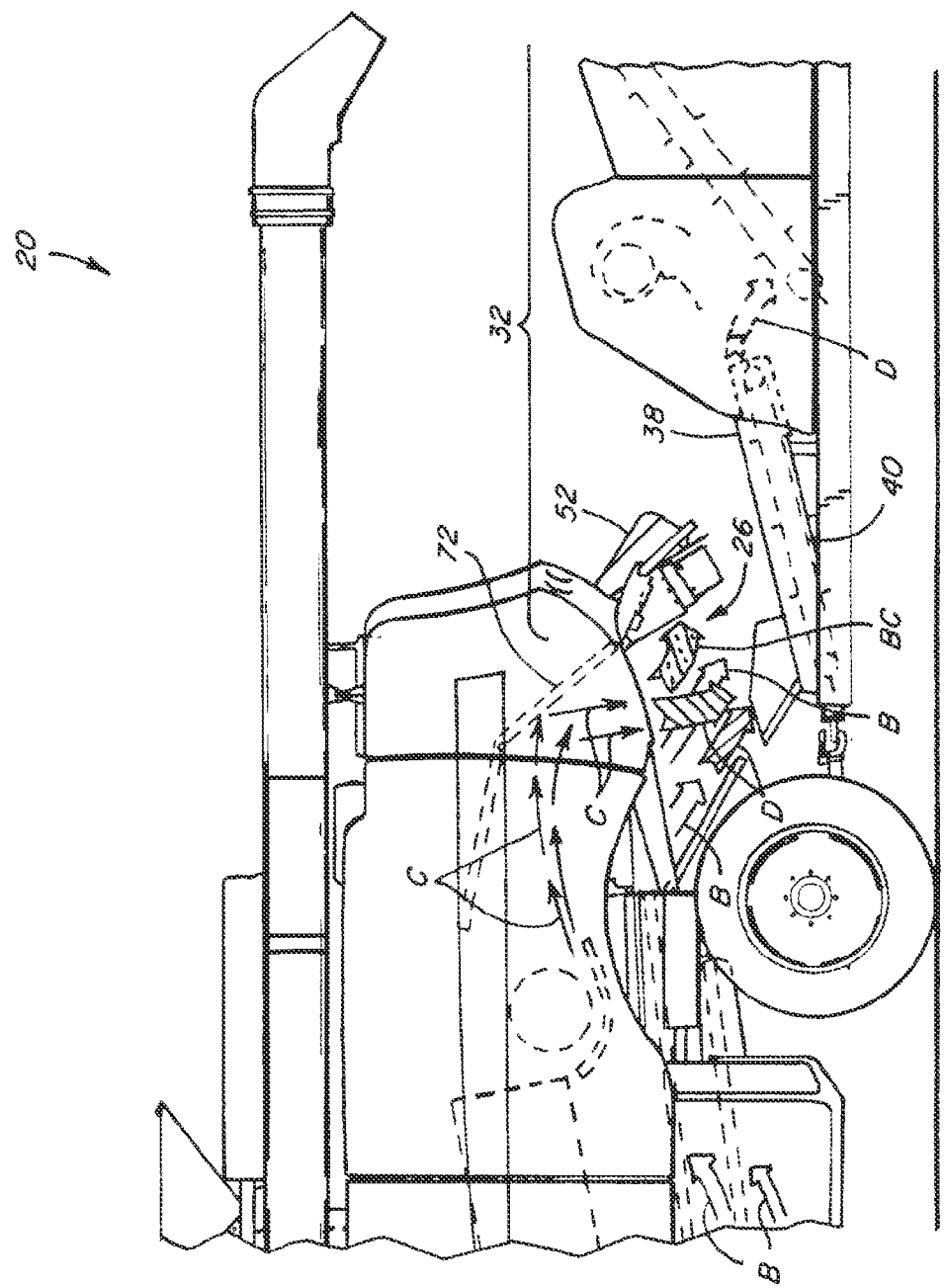
FIG. 11 is a fragmentary side view of the harvester and system of the invention, with the residue separating apparatus illustrated in the tilted operating position of FIG. 1 and illustrating aspects of operation thereof.

Referring also to FIGS. 10 and 11, as explained above, residue separating apparatus 52 can be located in a range of alternative positions, from a vertical position (FIG. 10) and at least one intermediate position between vertical and horizontal, as illustrated in FIG. 11. In some of these alternative positions, that is, in the vertical and tilted positions, first inlet opening 58 will be closed off to the residue flow and located behind deflector plate 72. Second inlet opening 60 will be positioned just below and rearwardly of plate 72, so as to directly face, or partially face or bound, the rear of discharge outlet 26. As a result, opening 60 will be all or partially in the path of flow B, on the opposite side of, and just rearward of flow C. As explained above, flow C will be deflected downwardly by plate 72, in this position so as to flow in front of opening 60 en route to conveyor 40 of conveyor system 38.

In operation, rotation of impellers 66 will generate the low or negative pressure condition in front of inlet opening 60, which will draw the air of flow B through flow C and into the opening. This rearward cross flow will be sufficiently powerful to separate the lighter elements of residue from the cobs and induct them into the separating apparatus, as denoted by arrows BC, while the heavier cobs, again because of their greater mass and momentum, will continue along their downward path to conveyor 40, as denoted by arrows D. With separating apparatus 52 in the intermediate or tilted position of FIG. 11, some induction of the lighter residue from the flow onto and along surface 46 of conveyor 40 can also occur. Again, air flow B will be powerful and voluminous, so as to function in cooperation with the low or negative pressure conditions generated by impellers 66, to separate, direct and induct the lighter elements of residue into apparatus 52 while leaving the heavier cobs and cob fragments to be conveyed away.

Again, once inducted into apparatus 52, the lighter residue and air will be propelled sidewardly therefrom through discharge openings 62 by impellers 66, and the clean cobs, denoted by arrows D, will fall onto belt 46 of conveyor 40, be conveyed thereby onto conveyor 42, and carried by that conveyor to cob collection device 44 (FIG. 1).

As another feature of the invention, to enable optimizing the cleaning effect of system 32, or achieving a desired cleaning effect, flows B and C, as well as the rotational speed and inductive capacity and characteristics of apparatus 52, can be adjusted as desired or required. For instance, air flow B may be increased or decreased as desired or required to achieve an advantageous cross flow for separating lighter residue from the heavier cobs, or one or more of the above parameters may be adjusted for inducting smaller cobs, cob fragments, and the like into separating apparatus 52, if desired. As another example, in an environment where many smaller cobs are present, it may be desired to reduce the force of flow B and/or induction, to reduce induction of the smaller cobs into the system. It may also be desired to leave some amount of the lighter residue in the cobs, all of which can be achieved by adjusting the system of the invention.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A cob conveying and cleaning system for a harvester operable for discharging a flow of cobs and other residue lighter than the cobs mixed with an air flow, comprising:
   a conveyor disposed beneath a discharge outlet of the harvester, to convey the flow of cobs and other residue lighter than the cobs from the harvester;
   residue separating apparatus including a housing disposed above the conveyor, the housing including at least one inlet opening disposed for receiving at least a portion of the air flow and facing the flow of cobs and other residue lighter than the cobs, the housing including an internal cavity containing at least one impeller rotatable in cooperation with the air flow from the harvester for inducting at least a substantial portion of the other residue lighter than the cobs into the housing through the at least one inlet opening and discharging the inducted residue from the housing through the at least one discharge opening, while leaving the cobs to be conveyed from the harvester;
   wherein the discharge outlet faces downwardly and rearwardly such that the air flow will be directed downwardly and rearwardly therethrough from the harvester, the conveyor is disposed below and rearwardly of the discharge outlet, and the residue separating apparatus is disposed just rearwardly of the discharge outlet such that the inlet opening is positioned in a path of the air flow, and wherein the at least one impeller is configured to generate sufficient induction when rotated, to induct the air flow in a manner so as to carry the residue lighter than the cobs away from the cobs and into the housing, and
   a deflector that deflects a flow of rearward air propelled from a threshing system of the harvester, the deflector deflects the flow downwardly to mix with a further flow from fan of the cleaning system for a break-up thereof, such that the further flow must pass through the flow before entering the at least one inlet system of the housing.

2. The system of claim 1, wherein a portion of the conveyor extends at least forward of an axis of rotation of the impeller.

3. The system of claim 2, wherein the inlet opening faces generally forwardly toward the discharge outlet.

4. The system of claim 2, wherein the inlet opening faces generally downwardly toward the conveyor and the housing encloses a portion of the area therebetween so as to direct at least some of the air flow toward the inlet opening.

5. The system of claim 2, wherein the inlet opening faces forwardly and downwardly toward the discharge outlet.

6. The system of claim 1, wherein the residue separating apparatus comprises two of the impellers configured for counter rotation in a side by side relationship within the housing, the impellers being configured so as to be rotatable for generating a low pressure condition adjacent to and outwardly of the at least one inlet opening, for drawing the air flow into the at least one inlet opening for inducting the residue lighter than the cobs away from the cobs and into the housing.

7. The system of claim 1, wherein the residue separating apparatus is adjustably movable relative to the harvester and the conveyor, for adjusting a position of the at least one inlet opening, and so as to be configurable when the conveyor is absent, for use as a spreader for receiving a flow of crop residue directly from the harvester and spreading the crop residue over a field.

8. The system of claim 1, wherein the conveyor is carried on a trailer towed by the harvester and powered by a system in connection with a power system of the harvester, the residue separating apparatus is carried on the harvester and powered directly by the power system thereof and is convertible for use to directly receive and spread crop.

9. The system of claim 1, wherein the inlet opening of the housing is positioned so as to extend along a path of the flow of cobs and other residue lighter than the cobs, and the at least one impeller is configured such that rotation thereof in combination with the air flow toward the at least one inlet opening will induct the other residue lighter than the cobs upwardly into the housing through the inlet opening while allowing the cobs to continue along the path from the harvester to the conveyor.

10. The system of claim 1, comprising a pair of the impellers, counter rotatable for propelling the other residue lighter than the cobs through a pair of discharge openings disposed on opposite sides of the housing, respectively.

11. A cob conveying and cleaning system for a harvester operable for discharging an airborne flow of cobs and other residue lighter than the cobs, comprising:
    a conveyor disposed beneath a discharge outlet of the harvester, configured and operable for receiving and conveying the flow of cobs and other residue lighter than the cobs from the harvester; and
    residue separating apparatus including a housing disposed on the harvester generally above the conveyor, the housing including at least one inlet opening disposed adjacent to a path of the flow of cobs and other residue for receiving at least a portion of the air flow, the housing containing at least one impeller configured for rotation in cooperation with the air flow from the harvester configured to separate at least a substantial portion of the other residue lighter than the cobs from the cobs and inducting the separated residue into the housing through the inlet opening and discharging the inducted separated residue through at least one discharge opening of the housing as the cobs are conveyed away by the conveyor;
    the at least one inlet receives a flow from fan of a cleaning system, the flow must pass through a flow of rearward air propelled from a threshing system of the harvester before reaching the at least one receiver; and
    a deflector that deflects the flow of rearward air propelled from the threshing system in front of the flow from fan of the cleaning system, to break up the flow from the fan.

12. The system of claim 11, wherein the at least one impeller is configured so as to be rotatable in cooperation with the air flow from the harvester for diverting the other residue lighter than the cobs from the cobs and into the at least one inlet opening.

13. The system of claim 12, wherein the at least one impeller is configured so as to be rotatable in cooperation with the air flow for lifting the residue lighter than the cobs from the conveyor while allowing the cobs to remain on the conveyor.

14. The system of claim 11, wherein the conveyor and the housing are configured so as to extend convergingly toward a downstream end of the conveyor, and wherein the housing partially encloses the conveyor, so as to operate to guide the portion of the air flow into the inlet opening of the housing.

15. The system of claim 11, comprising a pair of the impellers, counter rotatable for propelling the other residue lighter than the cobs through a pair of the discharge openings disposed on opposite sides of the housing, respectively.

16. The system of claim 11, wherein the residue separating apparatus is adjustably movable relative to the harvester and the conveyor, between a position wherein the at least one inlet opening is generally facing the discharge outlet of the harvester, and a position generally facing downwardly toward the conveyor.

17. The system of claim 11, wherein the conveyor is configured so as to have an upstream end disposed generally below the discharge outlet of the harvester, and a downstream end spaced rearwardly therefrom, and the residue separating apparatus is disposed in spaced relation above the upstream end defining a partial enclosure thereabout.

18. A cob conveying and cleaning system for a harvester operable for discharging a flow of air and a flow of cobs and other residue lighter than the cobs through a discharge outlet, comprising:
a conveyor disposed beneath the discharge outlet, configured and operable for receiving and conveying the flow of cobs and other residue lighter than the cobs from the harvester; and
residue separating apparatus including a housing disposed on the harvester generally above the conveyor, the housing including at least one inlet opening facing generally downwardly toward the conveyor in a position for receiving at least a portion of an air flow, the housing containing at least one impeller configured and rotatable in cooperation with the air flow from the harvester for inducting at least a substantial portion of the other residue lighter than the cobs into the at least one inlet opening, through the housing, and from the housing at another location, for separating and cleaning the other residue from the cobs;
wherein the discharge outlet faces downwardly and rearwardly such that the air flow will be directed downwardly and rearwardly therethrough from the harvester, the conveyor is disposed below and rearwardly of the discharge outlet, and the residue separating apparatus is disposed rearward of the discharge outlet such that the inlet opening is positioned in a path of the air flow, and
a deflector that deflects a flow of rearward air propelled from a threshing system of the harvester, the deflector deflects the flow downwardly to mix with a further flow from fan of the cleaning system, such that the further flow must pass through the flow for a break up thereof, to reach the at least one inlet system of the housing.

19. The system of claim 18, wherein the at least one impeller comprises a pair of the impellers located in side by side relation and operable for discharging the other residue from discharge openings on opposite sides of the housing.

20. The system of claim 18, wherein the conveyor is carried on a trailer towed by the harvester and the residue separating apparatus is carried on and powered by the harvester, and the residue separating apparatus is convertible for use as a residue spreader when the trailer is absent.

* * * * *